Figure 1:
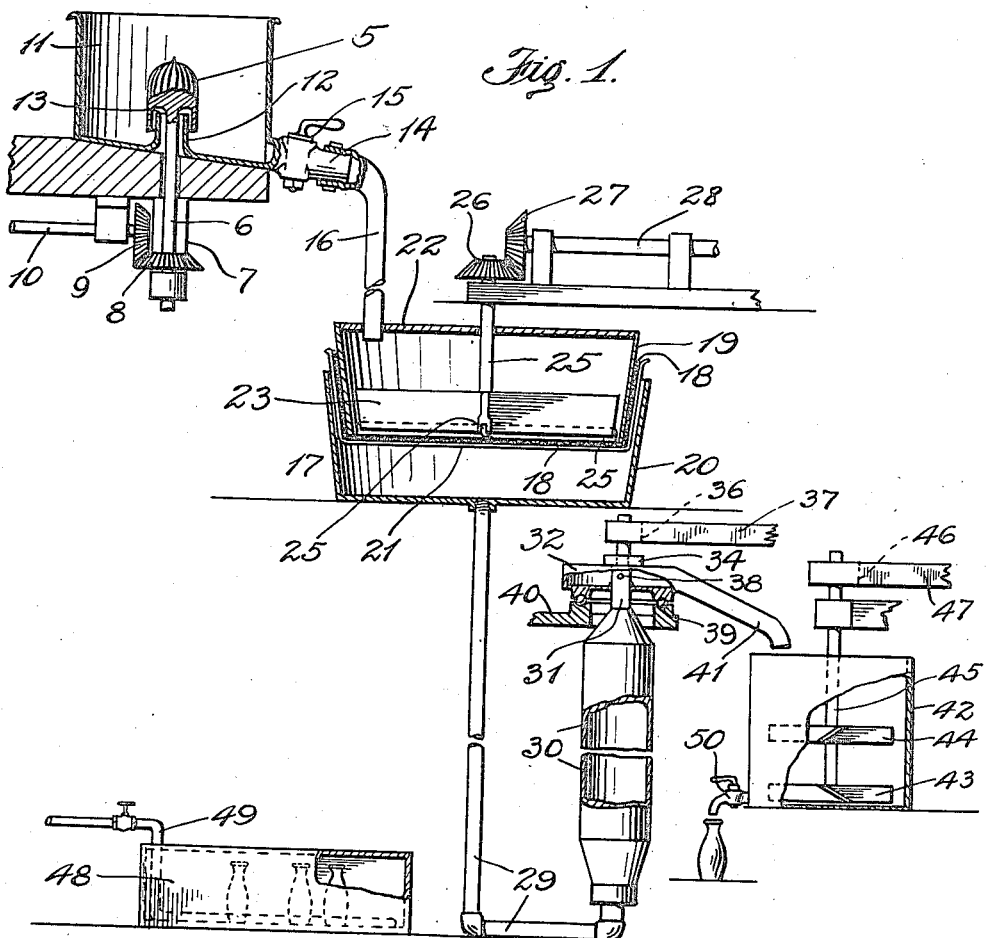

H. F. CHENEY.
PROCESS OF PREPARING AND PRESERVING FRUIT JUICES.
APPLICATION FILED JULY 7, 1915.

1,214,134.

Patented Jan. 30, 1917.
2 SHEETS—SHEET 1.

Witness:
Inventor:
Harry F. Cheney.
By Cassell Severance
Atty.

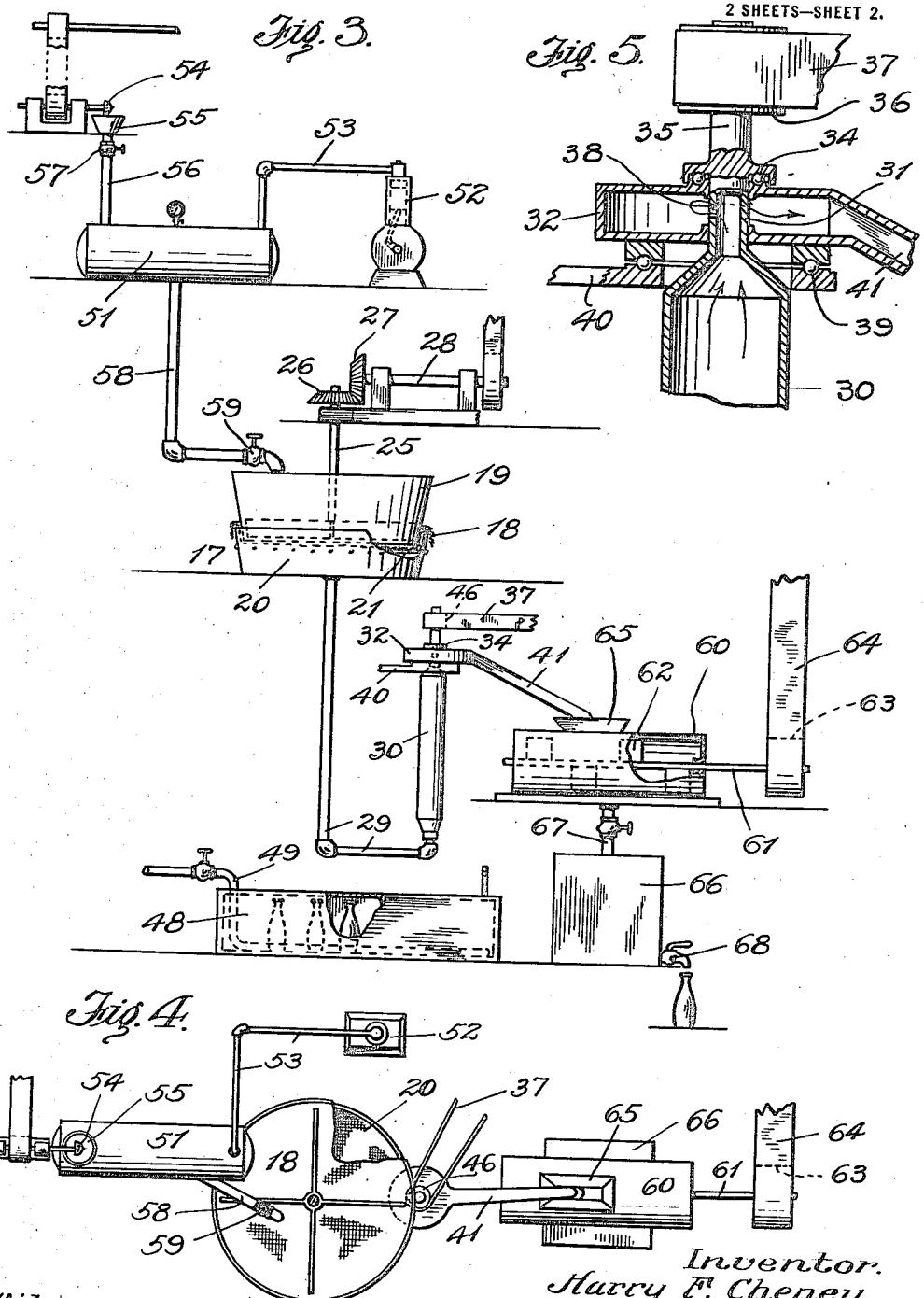

UNITED STATES PATENT OFFICE.

HARRY F. CHENEY, OF LOS ANGELES, CALIFORNIA.

PROCESS OF PREPARING AND PRESERVING FRUIT-JUICES.

1,214,134.  Specification of Letters Patent.  Patented Jan. 30, 1917.

Application filed July 7, 1915. Serial No. 38,414.

*To all whom it may concern:*

Be it known that I, HARRY F. CHENEY, a citizen of the United States, residing at Los Angeles, in the county of Los Angeles and State of California, have invented certain new and useful Improvements in Processes of Preparing and Preserving Fruit-Juices, of which the following is a specification.

This invention relates to an improved process for treating and preserving fruit juice, and more particularly the juice of citrus fruits. The process is especially desirable in the treating and preserving of orange juice, making it possible to extract the juice, separate the pulp therefrom and preserve and sterilize the same with substantially no chance for oxidation and deterioration of the juice and injuring of the same thereby.

It is an object of the invention to treat orange or other fruit juice in any suitable apparatus whereby the juice upon being extracted or expressed from the skins of the orange or fruit may be immediately acted upon for removing the bulk of the pulp therefrom, after which it is further clarified to remove the remaining portions of the pulp except a small percentage which is retained for flavoring and coloring the juice, after which the juice is mixed with a preservative and raised to a high temperature, sufficient to substantially sterilize the product without materially affecting the taste in the resultant liquid.

It is also an object of the invention to treat orange juice in an apparatus in which it may be kept out of contact with the atmosphere to a large degree thus preventing oxidation and the embittering of the juice, after which a proper proportion of the pulp is removed from the juice and the said juice is mixed with a preserving ingredient and subjected to a sufficient degree of heat to properly sterilize or pasteurize the resultant product, materials also being added to accentuate the orange taste in the final product.

It is a still further object of the invention to pass fruit juice and especially orange juice through an expressing device and into a holder from which atmospheric air has been largely exhausted, preventing the oxidation of the liquid, after which the liquid is treated by suitable filtering and clarifying means and then mixing it with sugar, after which it is bottled and sterilized, a flavoring substance being also mixed with the juice.

While the treatment of the juice may be accomplished with various kinds of apparatus, a mechanism suitable for carrying out the process has been illustrated in the accompanying drawings, preferable forms of mechanism having been shown suitably connected, for carrying out the different steps of said process.

Figure 2:
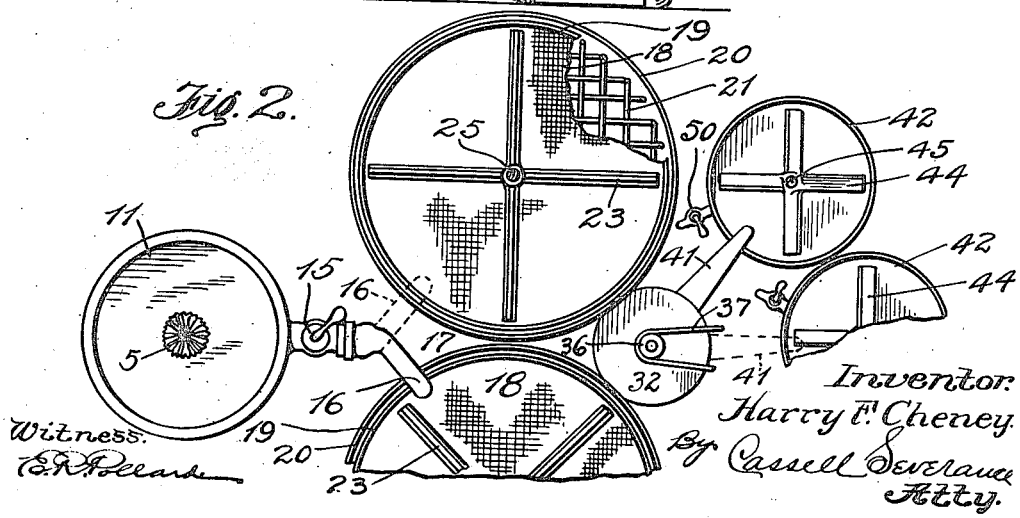

In the accompanying drawings forming a part of this specification: Figure 1 is a side elevation of a preferred form of apparatus for carrying out the process forming the subject matter of the present invention, portions of the mechanism being broken away and shown in section to better reveal the formation of the structures. Fig. 2 is a top plan view of a portion of the apparatus shown in Fig. 1 parts being broken away to better reveal the structure. Fig. 3 is a side elevation of the modified form of apparatus used for treating fruit juice. Fig. 4 is a top plan view of the said modified form of apparatus, portions being broken away and shown in section. Fig. 5 is an enlarged fragmentary detail sectional view of the upper portion of the clarifier and of the spout leading therefrom.

The process forming the subject matter of this invention is designed to make it possible to treat citrus juice, and particularly orange juice in an expeditious manner, both for removing the bulk of the pulp therefrom and sufficiently clarifying the same, as well as for combining it with a preserving material and pasteurizing or sterilizing it, whereby the juice is in condition to be kept indefinitely and yet has all of its pleasant flavor retained, making it taste like the juice when first extracted from the fruit. In treating orange juice especially it is very desirable that it be kept out of contact with the air as much as possible, either by treating it in a mechanism requiring a very short time to carry out the process, or in an apparatus in which the air may be partially exhausted and kept out of contact with the juice.

The various steps of the process will now be set forth reference being had to the apparatus illustrated in the drawing. The juice of the fruit is extracted in any suitable manner but preferably by applying the fruit after being cut in half to the rotating member or reamer 5, which is rotatably mounted upon a shaft 6 carried by suitable bearings in the frame work 7. Gearing 8 and 9 connects the said shaft with a shaft 10 for rotating the reamer, the said shaft 10 being connected in any desired manner with any suitable source of power not shown. The reamer is mounted within a receptacle 11, the bottom portion of which is turned upwardly around the shaft 6 at 12 so as to extend within a hollow portion 13 formed in the bottom of the reamer. The juice and pulp from the fruit when pressed against the reamer will thus run down into the receptacle 11 and can be carried out through one or more spouts 14 controlled by one or more valves or stopcocks 15. A flexible tube or hose 16 is usually applied to the spouts 14 for conducting the juice into any other adjacent receptacle. The reamer 5 is kept running continually when the operation is progressing and it is only necessary to press the halved oranges or other citrus fruit against the top of the reamer in order to remove the juice and pulp therefrom.

It is next important to remove the bulk of the pulp and for this purpose the flexible tube 16 is arranged to discharge into one or more straining or filtering tubs as at 17. There are usually more than one of such receptacles arranged in proper position to receive the juice and they are so constructed as to filter or separate the bulk of the pulp from the juice. While such straining tubs or receptacles may be of various construction, the form illustrated in the drawing is admirably adapted for the purpose desired. Each of such tubs 17 is provided with a coarse filtering material usually an open meshed fabric 18, the edges of which extend between the inner and outer telescoping portions 19 and 20 respectively of the tub structure. The walls of these tub sections are preferably tapered so that when the upper one is set into the lower one, the edges of the fabric 18 will be clamped between them. One or more rods 21 may also be arranged across the tub structure, immediately beneath the fabric, in order to prevent the fabric from sagging. The said rods may be in the form of cross wires to form a supporting grid if desired. The top of the tub may be provided with a cover 22 if desired although of course the top may be left open. By having a plurality of tubs 17 near the outlets of the juice extracting mechanism, when it is necessary to remove the accumulations of pulp and wash either one of the tubs, the process need not be stopped but the juice may be run into another tub by changing the flexible tube 16 from one to the other. It is also necessary to keep the upper surface of the fabric 18 cleared of pulp, otherwise the pulp will very rapidly close the mesh of the fabric and prevent the juice from running through. A simple method of obviating this difficulty is the operation of one or more paddles 23 or stirring blades, which are carried by a shaft 24 extending into the upper end of the tub structure. The lower edges of the paddle are preferably provided with flexible strips 25, usually of rubber which engage the surface of the fabric, and when the paddles are turned, sweep the said surface clear of pulp so that the juice has an opportunity to run through. Any suitable gearing as 26 and 27, and actuating shaft 28 therefore may be employed for constantly operating the paddles. When it is necessary to thoroughly clean out the tubs the inner tub section 19 is lifted out of place and the fabric removed and cleansed.

The liquids are continually run into the tubs 18 when the process is being carried on and passes thence through suitable piping 29 into a mechanism for further removing more of the pulp. While such means may consist of any suitable separator, filter, or the like, a rotating clarifier 30 is well adapted for the purpose. The said clarifier preferably consists in the hollow cylinder connected at its lower end with a piping 29, any suitable swivel or packed joint being made between its parts. The outlet of the clarifier is at the top through a pipe extension 31 thereof, which passes through a casing 32 and is supported at 34 upon any suitable bearings, usually ball bearings. A shaft extension 35 is provided with a pulley 36, adapted to receive a belt 37, by which the shaft may be rotated and the clarifier revolved to further separate the pulp from the juice. The pipe extension 31 is provided with one or more outlets or openings 38 within the casing 32 through which the juice escapes from the clarifier into said casing. The casing 38 is also preferably mounted upon any suitable bearings as 39 supported upon a frame 40. The casing 32 is provided with an outlet spout 41 adapted to deliver the liquids into a mixing receptacle or barrel 42. If a plurality of receptacles or barrels 42 are provided, the spout 41 may be turned from one to the other so that when one is full the juice can be run into another one while the first barrel is being emptied by the bottling of the liquid. The clarifier 30 is usually run at a very high rate of speed and the larger portion of the remaining pulp in the juice is thrown out by centrifugal force and is collected upon the inner surface of the clarifier walls, the central portion of the clarifier being thus left free for the liquids to rise and be thrown out in the casing 32. It is of course occasionally necessary to stop the operation of the clarifier and flush out by a stream of water, the interior thereof to remove the pulp which has collected upon its walls.

When the juices are delivered into the receptacles or the barrels 42, they are mixed with a suitable preserving means, preferably sugar, about four pounds of sugar to a gallon of juice being usually employed. The sugar is thoroughly mixed and dissolved by an agitating mechanism mounted within the said receptacle 42, said agitating mechanism usually consisting of paddles 43 and 44 carried by shaft 45 to the outer end of which is secured a driving pulley 46. A power belt 47 driven in any suitable way, engages said pulley 45 for turning it and moving the paddles. In order to quickly and thoroughly mix the sugar a lower set of paddles are preferably turned so as to tend to lift the materials in the receptacle, while the upper set of paddles 44 are turned to force the materials downwardly.

While the juices are in the mixing receptacle 42, a suitable flavoring essence is usually added to accentuate the original taste of the juice and for example, is made by taking some of the oil of the orange from the orange skins and dissolving it in fluid alcohol with a little carbonate of magnesia. Such an essence is made by dissolving one and one-fourth ozs. of orange oil and twelve fluid ozs. of alcohol, mixing the same and rubbing in about two ozs. of carbonate of magnesia, and pouring the same into two quarts of water. After allowing the solution to stand for about a week with daily shaking, it is filtered through paper and added to water sufficient to make up two quarts. The carbonate of magnesia breaks up the oil so that it will be thoroughly dissolved in the alcohol and so that the oil will mix with the water and juice. If desired the oil, alcohol and carbonate of magnesia may be mixed to a comparatively dry paste and be afterward mixed with the water as required.

If necessary also a small quantity of citric acid may be added to the sweetened juice preferably in the proportion of one oz. thereof to one gallon of juice. The citric acid solution is usually prepared by dissolving one pound of citric acid in one gallon of water. After the juice is sweetened and flavored, it is run into bottles and sealed. The juice is then subjected to a proper degree of heat for pasteurizing or sterilizing the same. It is usually necessary to subject the bottled juice to a temperature of about 155 degrees Fahrenheit for say about 20 minutes, usually by placing the bottles in a tank 48 containing water heated to a desired temperature. The said water may be heated by a steam coil 49 or other means if desired. After heating the bottles for about 20 minutes they are removed from the tank 48 and at the expiration of 48 hours the said bottles of juice are again placed in the tank and subjected to the same temperature for the same length of time. It is necessary to subject the juice to the second heating for the reason that the first heating apparently only kills the parent bacteria, but does not dispose of the spores. The second heating also disposes of the spores, and the juice will keep indefinitely thereafter and without fermenting or the formation of any kind of skum.

By the addition of the flavoring extract either with or without the addition of citric acid, the original flavoring of the fruit is sufficiently accentuated to be preserved even after the sterilizing process, and the thick juice has substantially the taste of the original juice as extracted, in the resultant product. By the use of the tubs or filtering devices, about 85% of the pulp is removed from the juice, and the clarifier removes from 10 to 12% thereof, thus leaving only about 3 to 5% of the pulp in the end product which is necessary to secure the full flavor desired and to furnish the juice with a satisfactory color. It will be evident also that other kinds of pulp removing devices may be used in place of the clarifier described, such for instance as a suitable filter, but for a rapid continuous process the clarifier gives great satisfaction. The process is rapid and continuous when carried out in the apparatus described, it requiring only about five minutes from the time the juice is extracted until it is mixed with the preserving sugar. This is important since a protracted exposure of the juice to the atmosphere facilitates oxidation thereof and tends to make the juice bitter and to start other deleterious results. By supplying a plurality of filtering tubs and a plurality of mixing receptacles or sweetening vats, the process may be continued rapidly and without interruption, for while one filtering tub is being cleansed the juice is run through an adjacent tub, and when one mixing vat or receptacle is being filled, another may be emptied, its contents being run into the bottles, one or more draw off faucets as 50 being employed. Of course it will also be understood that a number of reamers may be used and a corresponding number of sets of filtering tubs and sweetening vats employed, all within the spirit and scope of this invention.

Where it is not so convenient to filter and clarify the juice immediately after its extraction from fruit, the oxidation thereof may be largely prevented by running the juice into a tank or receptacle 51 from which the air is largely exhausted. In this instance any suitable vacuum pump 52 may be connected by piping 53 with the said tank or receptacle 51 for continually maintaining a partial vacuum in the said tank 51. In using said tank the juice falls from a reamer as 54 into a funnel 55 carried by a pipe 56 in which a controlling valve 57 is interposed. An outlet pipe 58 is also connected with the tank and its outlet arranged over one of the filtering tubs and controlled by a valve 59. When a sufficient quantity of juice has been collected in the receptacle or tank 51, it may be kept therein until it is desired to filter and mix the juice with the sugar or other ingredients, the juice being thus kept out of contact with the atmosphere and the deleterious results of oxidation prevented. When it is desired to carry out the later steps of the process, the juice is drawn off from the tank 51 into the filtering tub by opening the valve 59, the valve 57 being also opened for admitting atmospheric pressure to the interior of the tank, and permitting the juice to flow from the same.

It will be readily understood that the different portions of the apparatus may be considerably altered and varied in shape and construction without departing from the spirit of the invention. Thus as shown in Fig. 3 a reamer carried by a horizontal shaft may be employed. The mixing receptacles or vats in which the juice is sweetened may also be differently formed, thus instead of the upright vats 42 horizontal receptacles or cylinders 60 may be employed in which a horizontal shaft 61 is mounted and provided with stirring blades or paddles 62. A pulley 63 and a belt 64 may be used for operating said paddles. In this instance also the juice is discharged from the clarifier into a hopper 65 mounted in the upper portion of the cylinder 60. The sweetened and filtered juice may be drawn off from the cylinder 60 into a receptacle 66 through a valve controlled pipe 67 where the liquid is kept inclosed and substantially out of contact with the atmosphere until it is run off through a suitable faucet 68 into the bottles.

It will be evident from the above description that various kinds of mechanisms suitable for carrying out the steps of this process may be employed, the essential features of the process being the extraction of the juice without prolonged exposure to the atmospheric air, and the resultant oxidation, and the removal of substantially all the pulp, after which the juice is mixed with a preserving substance and subjected to a proper degree of heat for sterilizing the same. It will also be seen that a prevention of oxidation to any appreciable degree is obtained either by a continuous rapid carrying out of the steps of the process as in the apparatus disclosed in Fig. 1 or the keeping of the juice out of contact with the air in a partial vacuum until the preserving portions of the process have been carried out. The successive heating of the juice to a moderate temperature, only sufficient to kill the bacteria and spores, does not materially change the juice in taste so that with a very slight flavoring the original raw fruit taste is obtained.

In treating fruit juices, particularly citrus fruit juices, the receptacles should be made of materials that will not be affected by the juice. The receptacles or tanks can be of wood, aluminum, glass, porcelain or other materials unaffected by citrus juice. The piping may be of aluminum or like material, all within the scope of the invention.

What is claimed is:

1. The process of preserving fruit juices comprising the extracting of a greater portion of the fruit pulp from the expressed juice and collecting the juice in closed apparatus whereby oxidation is largely prevented, and mixing the juice with a preservative, and then subjecting the product to a sufficient degree of heat to substantially sterilize the same.

2. The process of preserving fruit juices comprising the expressing of the juice and pulp of the fruit and collecting it in closed apparatus for substantially preventing oxidation and subjecting the said products to the action of an inclosed filtering means for removing a large portion of the pulp, then mixing the clarified juice with a preserving material and subjecting the resultant juice to a sterilizing temperature.

3. The process of preserving fruit juices comprising the expressing of the juice and pulp of the fruit and passing the same through a filtering medium to remove the bulk of the pulp, and then through a clarifying device for removing an additional quantity of pulp, next sweetening and flavoring the juice and bottling the same and then sterilizing the bottled juice by subjecting it to a sufficiently high degree of heat to destroy the bacteria in the juice.

4. The preserving of citrus fruit juices consisting of the process of reaming out the contents of the fruit from the skins thereof, passing the same through a filterer capable of removing and coloring the bulk of the pulp from the juice, then passing the juice through a centrifugal clarifier for removing all of the pulp except a small quantity for flavoring and coloring purposes, then mixing sugar with the juice and subjecting the juice to repeated temperatures of approximately 155 degrees Fahrenheit, whereby bacteria and spores present in the juice will be destroyed.

5. The continual process of preserving citrus fruit juice comprising the rapid passing of the juice and pulp successively through a filterer and a clarifier and then mixing with a preservative, after which the juice is raised to a temperature of approximately 155 degrees Fahrenheit for substantially sterilizing the same.

6. The continual process of preserving citrus fruit juices comprising the application of divided fruit to a reamer, conducting the fruit and pulp into one of a series of filtering devices, agitating the mixture upon the filtering surface for facilitating the passage of the juice through the same, then directing the juice through a centrifugal clarifier for separating an additional amount of pulp from the juice leaving only enough for coloring and taste, collecting the juice in one or more receptacles and stirring sugar therein in substantially the proportion of four pounds of sugar to one gallon of juice, then drawing off the sweetening juice into bottles and placing the bottles in heated water to sterilize the said juice and destroy the bacteria present therein.

7. The process of extracting and preserving citrus fruit juices comprising, the expressing of the juice and pulp and collecting the same in a closed receptacle under a partial vacuum whereby oxidation of the juice is prevented then filtering and clarifying the juice for separating the greater portion of the pulp therefrom, flavoring the juice with an extract containing citrus oil, alcohol and carbonate of magnesia in suitable proportions, and mixing a preservative with said juice after which the juice is subjected to repeated heats of approximately 155 degrees Fahrenheit for sterilization.

8. The process of preserving citrus fruit juice comprising the collecting of the juice in a partial vacuum, and removing the pulp from the juice after which it is mixed with a sweetened preservative and is subjected to a pasteurizing heat.

9. The process of preparing and preserving citrus fruit juices comprising the removal of the bulk of the pulp from the extracted juice and inclosing the same in closed apparatus whereby it is largely kept from oxidation, and then passing the same through a clarifier, after which the juice is mixed with a preservative, the whole being a continuous process whereby the juice is preserved before it has been exposed to the atmosphere sufficiently long to permit of oxidation.

10. The process of preserving fruit juices comprising the continuous passing of extracting juices through a filter for removing the bulk of pulp and fibrous materials, and then through a centrifugal clarifier for throwing out additional pulp and fibrous material, then mixing the clarified juice with sugar in preserving quantities.

In testimony whereof, I have hereunto set my hand, in presence of two witnesses.

HARRY F. CHENEY.

Witnesses:
   CASSELL SEVERANCE,
   EARLE R. POLLARD.